United States Patent [19]

Hall

[11] 4,320,425
[45] Mar. 16, 1982

[54] CENTERING AND MOUNTING APPARATUS FOR A MAGNETIC RECORDING DISC

[75] Inventor: Robert C. Hall, San Francisco, Calif.

[73] Assignee: Memorex Mini Disc Drive Corporation, Santa Clara, Calif.

[21] Appl. No.: 138,779

[22] Filed: Apr. 10, 1980

[51] Int. Cl.³ .................... G11B 23/04; G11B 25/04
[52] U.S. Cl. .................................... 360/97; 360/133
[58] Field of Search ................. 360/97, 98, 99, 133, 360/135, 132, 86; 206/444; 346/137

[56] References Cited

U.S. PATENT DOCUMENTS 3,706,085  12/1972  Mowry et al. ................. 360/97
4,078,246   3/1978  Berthoux et al. ............. 360/133
4,232,870  11/1980  Iemenschot .................. 360/97 X Primary Examiner—John H. Wolff
Attorney, Agent, or Firm—Limbach, Limbach & Sutton

[57] ABSTRACT

Apparatus is disclosed for centering and mounting a magnetic recording disc on a disc drive and includes on the recording disc a deflectable member radially inward of the recording surfaces, to which member is attached a generally spherically curved centering member which is received into a hollow portion of the disc drive spindle, and positioned radially between the disc recording surface and the deflectable portion of the deflectable member is a rigid hub portion for reception and driving engagement with the disc drive spindle.

12 Claims, 8 Drawing Figures

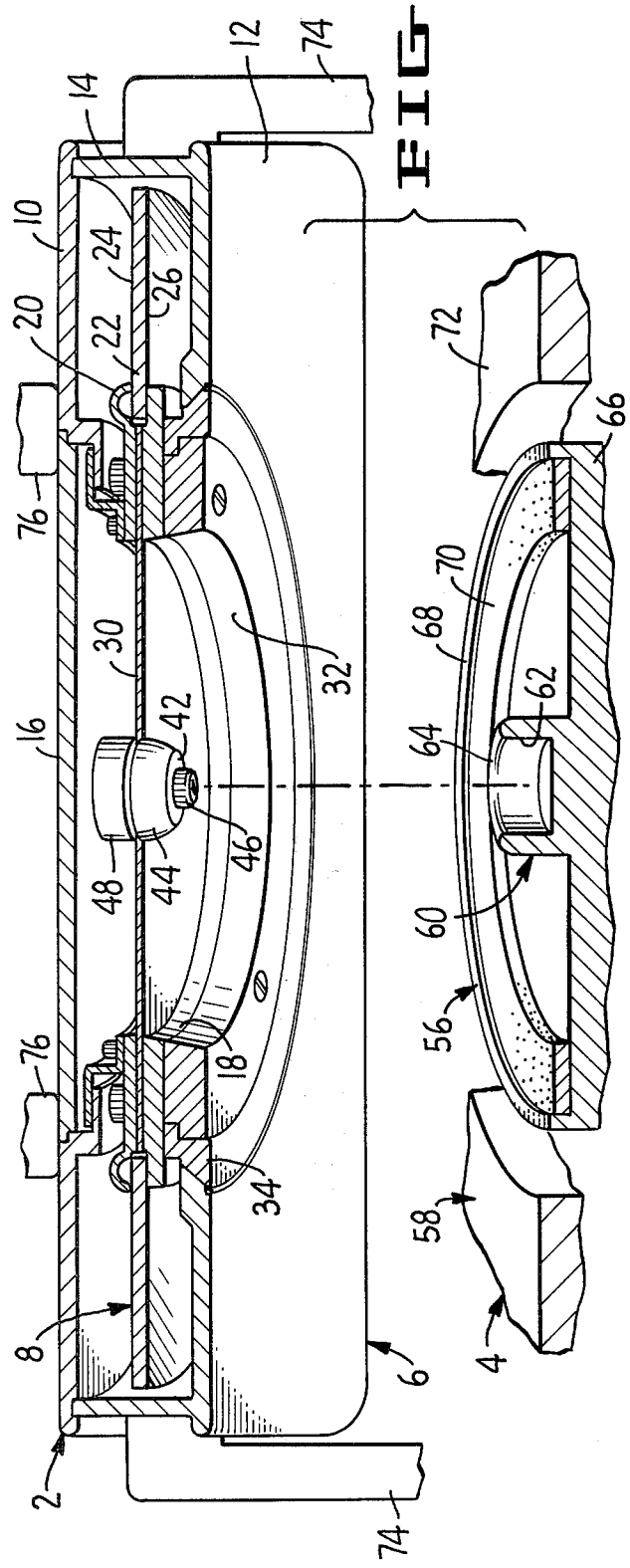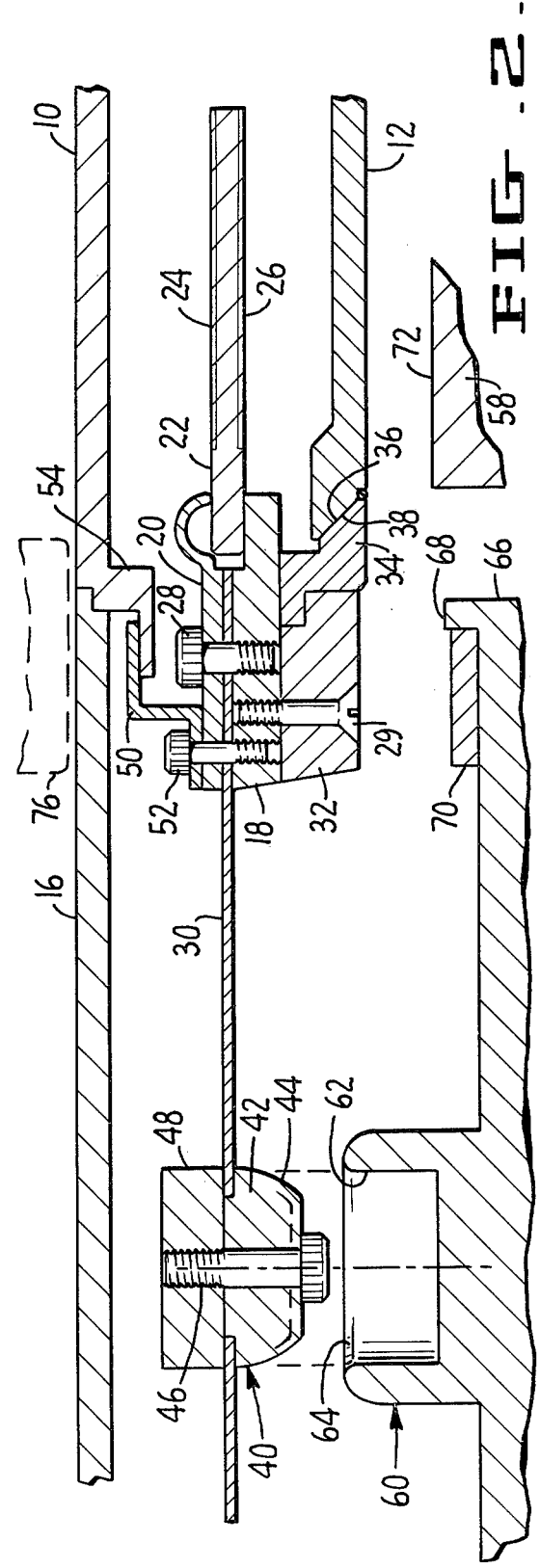

CENTERING AND MOUNTING APPARATUS FOR A MAGNETIC RECORDING DISC

BACKGROUND OF THE INVENTION

This invention relates to a magnetic disc recording system, and more particularly to apparatus for centering, mounting and rotatably driving a removable recording disc within such system.

In magnetic recording disc drives systems utilizing removable disc recording media, it is necessary to locate such removable media very accurately both vertically and radially with respect to the axis of rotation in order that the recording and playback transducers attached to the drive may repeatably track the data recorded upon the disc. This requirement is particularly acute with the pursuit of ever higher recording densities and thus narrower and more precisely located recording tracks upon each disc. Such recording densities now exceed 1,000 per inch of radius upon some of the newer rigid disc systems. The problem is also made more acute by the desirability of ready removability of such recording discs contained within cartridge housings so that the cartridges may be quickly interchanged, while still retaining the precise positioning necessary for the high densities.

Various approaches to such mounting and rotational driving of the disc have been attempted. Most commonly there have been used various modifications of a conical spindle upon the disc drive with a conical recess in the center of the disc hub, so that the mating engagement between the two conical surfaces serves to provide for the necessary location of the disc. With such mountings the necessary rotational drive may be provided either through the conical hub and spindle or through engagement between other portions of the hub and disc drive.

While such conical spindle and hub recess arrangements have proved satisfactory in systems utilizing lower recording densities, it has been found that even small particles of foreign matter on either the spindle or the conical recess, or even slight irregularities of wear cause mispositioning of the disc with respect to the spindle sufficient to preclude accurate recording at the new, higher recording track densities. Accordingly, it has been necessary to seek other centering and drive arrangements for satisfactory use with high density recording arrangements.

SUMMARY OF THE INVENTION

It is an object of the present invention to overcome the foregoing disadvantages of the prior art and to provide for the necessary precise centering and positioning of the recording disc with respect to the drive and also to provide for its rotational driving. To achieve this and other objects, which will become apparent from the following description, mounting and driving apparatus is provided for a magnetic recording disc for use with a disc drive, which disc drive includes a rotatably driven spindle having a cylindrically hollow portion with an open outer end centered upon the axis of rotation and a disc hub supporting and drivingly engaging portions spaced radially outwardly from the cylindrically hollow portion. The mounting and driving apparatus of this invention includes a member forming a portion of the disc and extending radially inwardly of the recording surface of the disc and having an axially deflectable portion generally adjacent the disc axis. Additionally, a centering member is coaxially mounted to the deflectable member and extends downwardly of the lower surface thereof and has a generally spherically curved convex surface curving inwardly toward the axis and away from the deflectable member, the spherical radius of the centering member being greater than the internal radius of the spindle hollow portion. A rigid hub portion of the disc is positioned radially between the disc recording surface and the deflectable portion of the deflectable member, the lowermost part of the rigid hub portion being positioned such that the disc centering member and the spindle cylindrically hollow portion engage one another before the disc hub rigid portion is engaged by another portion of the spindle for supporting and drivingly engaging the disc when the disc is advanced generally axially toward the spindle.

BRIEF DESCRIPTION OF THE DRAWINGS

For purposes of illustration of the present invention, particularly preferred embodiments are described in detail below with respect to the illustrations in which:

FIG. 1 is a fragmentary sectional view taken through the center of a particularly preferred embodiment of a recording disc cartridge and the disc driving portion of a disc drive unit;

FIGS. 2, 3, 4 and 5 are enlarged sectional views of the apparatus of FIG. 1 illustrating the sequence of events as the disc and cartridge are brought into centering and driving engagement with the disc drive apparatus;

DETAILED DESCRIPTION OF PREFERRED EMBODIMENTS

Figure 3:
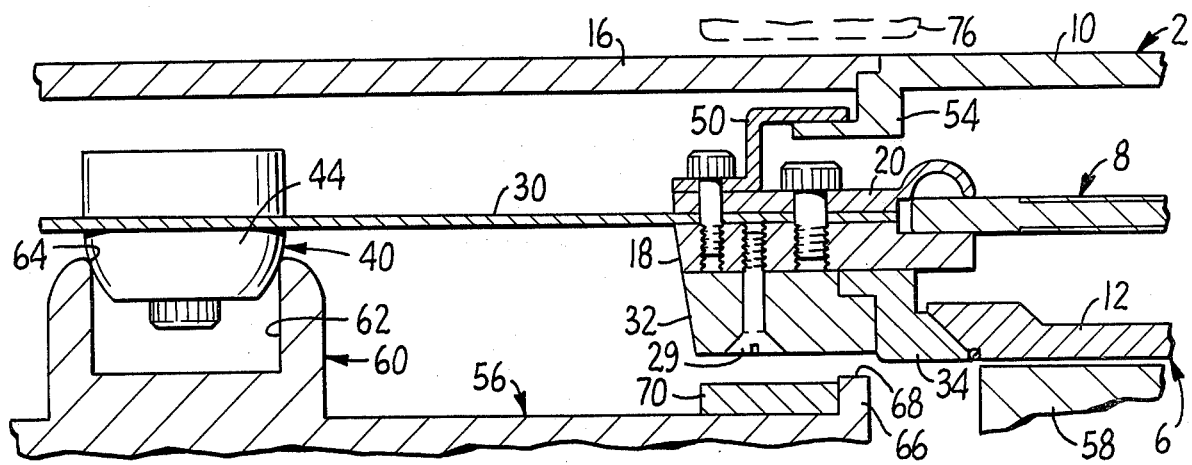

A particularly preferred embodiment of the apparatus of this invention is illustrated in the fragmentary sectional view of FIG. 1, which represents a section taken through the center of a magnetic recording disc cartridge, generally indicated by reference numeral 2, and a disc drive unit, generally indicated by reference numeral 4, for drivably receiving the disc and cartridge 2.

The cartridge 2 comprises generally a cartridge housing 6 and a recording disc assembly 8 contained therewithin. The housing 6 includes an upper member 10 extending generally transversely of the axis of the disc 8 over the upper surfaces of the disc, and a lower member 12 which is generally parallel to the upper member 10 and extends below the disc 8. A peripheral portion 14 of the cartridge extends between the upper member 10 and lower member 12 and may, if desired, be molded integrally with the lower member 12 in a suitable, rigid synthetic resin. The upper member 10 may be attached to the peripheral portion 14 by cementing, heatstaking, the use of threaded fasteners, or other suitable means. For reasons to be described below, the central portion of the upper panel 10 may be open, and filled by a separate central panel 16.

Recording disc assembly 8 includes a rigid hub portion 18, which is attached by means of clamping member 20 to, and radially inward of, the recording portion 22 of the disc, which in turn carries the magnetically sensitive recording surfaces 24 and 26 of the disc, as shown most clearly in FIG. 2. The clamping member 20 is attached by fasteners, such as cap screws 28, to an axially deflectable member 30 and hub rigid portion 18. A lower, magnetically attractable hug rigid portion 32 is also attached to rigid portion 18, suitably by threaded fasteners 29. The magnetically attractable portion 32 may suitably be formed of an appropriate ferrous material with deflectable member 30 suitably formed of thin stainless steel or beryllium-copper, while clamping member 20 and hub rigid portion 18 may suitably be formed of a material such as aluminum. By virtue of the attachment by fasteners 28 and 29, the magnetically attractable portion 32 and hub rigid portion 18 may effectively be considered to be a unitary structure.

Adjacent the magnetically attractable portion 32 is dust sealing member 34 which suitably is formed from a synthetic resin and is captured by the hub lower portion 32 and which has a radially outer surface 36 which tapers conically outwardly and downwardly. The lower housing member 12 includes a matingly conical surface 38 for engaging the conical surface 36 to form a resilient conical seal with member 34 to exclude foreign matter from the interior of the cartridge, in a manner to be described below.

Attached coaxially to the deflectable member 30 is centering member 40 which includes a lower portion 42 extending downwardly of the lower surface of the deflectable member 30 and having a generally spherically curved convex surface 44 tapering radially inwardly away from the deflectable member 30. The center of curvature of the member 40 lies substantially on the axis of the recording disc 8 and generally in a plane which, when the disc is mounted to the drive, extends through the center of the recording portion 22 thereof and is substantially parallel to recording surfaces 24 and 26. The lower portion 42 of the member 40 may be attached, suitably by cap screw 46 to a backing plug 48 on the upper side of the deflectable member 30.

Attached to hub rigid portion 18 is retaining means 50, suitably in the form of a ring having a z-shaped cross-section. Retaining ring 50 may suitably be attached to the hub rigid portion by cap screws 52. This retaining ring 50 cooperates with the upwardly facing surface of retainer lip 54 affixed to, or molded integrally with, cartridge housing upper member 10 as illustrated in FIG. 2, and as will be described below.

The disc drive unit, illustrated fragmentarily and denoted generally by reference numeral 4 in FIG. 1, includes, for the purpose of this invention, two general portions—drive spindle 56 and cartridge support 58. The drive spindle 56 further includes a cylindrically hollow portion 60 surrounding the axis of rotation, the internal surface of which portion 60 has the configuration of a body of revolution for receiving and engaging the spherically curved surface 44 of the disc hub centering member 40 in a manner to be described below. This hollow portion internal surface includes a generally right circular cylindrical portion 62 concentric with the axis of rotation, the radius of this cylindrical portion 60 being smaller than the spherical radius of the centering member 40. This spindle hollow portion 60 preferably includes at its outer end a conical portion 64 for engaging the disc centering member in a manner to be described below.

The disc spindle 56 also includes a hub supporting portion 66 spaced radially outwardly of the hollow portion 60. This disc supporting portion 66 includes disc hub supporting surface 68, which receives and drivingly engages the lower surface of the disc rigid hub portion. Immediately adjacent and at a level slightly below that of the hub supporting surface 68 is provided a magnetic material 70, suitably in the form of an annular ring of rubber magnetic material affixed to the spindle.

The drive also includes a cartridge housing support 58 having an upwardly facing cartridge engaging surface 72 for engaging the bottom surface of the lower member 12 of the cartridge housing, in a manner to be described below.

Additionally, the drive unit includes means, such as bracket 74, for receiving the cartridge and moving it in a direction generally parallel to the spindle axis to an installed position which will bring the disc hub into driving engagement with the spindle. Associated with the bracket 74 are means, such as member 76, which is brought to bear compressively against the upper member 10 of the cartridge housing when the cartridge is brought into operative engagement with the disc drive, in a manner to be described below. The member or members 76 may engage the cartridge upper member 10 at any suitable point inwardly of the cartridge housing peripheral portion 14. Bracket 74 suitably may be pivotally mounted to the drive unit for pivotal movement which approximates movement in a direction parallel to the spindle axis. The drive, of course, includes the conventional components, such as an appropriate spindle drive motor and recording/playback transducers which, along with appropriate and conventional electronic circuitry, cooperate with the recording disc to effect the desired recording and playback of data and information.

The general components of the present invention having been described briefly above, its manner of operation and the cooperation between the various components may be seen with reference to the sequential illustrations of FIGS. 2 through 5, which illustrate the sequence of events of the insertion and movement of a recording disc and cartridge into driving engagement with the disc drive spindle. In FIG. 1 the relationships are exaggerated for purposes of illustration and explanation, with the cartridge 2 in a position spaced away from the spindle 56. As the cartridge is moved toward driving engagement with the spindle, as illustrated in FIG. 2, the disc hub centering member 40 is roughly aligned with the axis of the spindle while it is still spaced from engagement with the spindle. While the cartridge is spaced from such engagement, the disc retaining ring 50 is in engagement with the support ring 54 of the cartridge housing, generally centering the disc 8 within the cartridge and holding the disc up such that there is resilient engagement between the conical surface 36 of the disc hub portion and the matingly conical surface 38 of the lower member 12 of the cartridge housing 2. Such cooperation serves to hold the disc centered, away from contact with the housing peripheral portions 14 to protect the disc against damage which might be caused from its rattling loosely within the housing.

As the cartridge continues to be moved toward the spindle of the drive unit, FIG. 3 illustrates the relationship provided such that the disc centering member 40 and the conical portion 64 of the spindle hollow portion engage one another before the hub supporting surface 68 engages the lower, magnetically attractable portion 32 of the rigid hub portion. This initial engagement between the centering member 40 and the spindle hollow portion thus serves to provide precise centering of the disc with respect to the spindle hollow portion, and thus the overall spindle, before there is any clamping engagement of the disc and the spindle. Additionally, since the spherical radius of curvature of the surface 44 of the centering member 40 lies not only on the axis of the recording disc but also generally in a plane through the center of the recording disc, any cocking or misalignment of the centering member 40 will have no significant effect upon the actual centering of the recording disc with respect to the axis of rotation of the spindle 56. It may be noted that, in FIG. 3, with both the deflectable disc member 30 and the cartridge housing 2 in their undeflected states, the disc retaining ring 50 remains in holding engagement with the cartridge housing retainer lip 54, and the conical disc hub flange 34 remains engaged with the mating portion of the cartridge housing bottom member 12.

Figure 4:
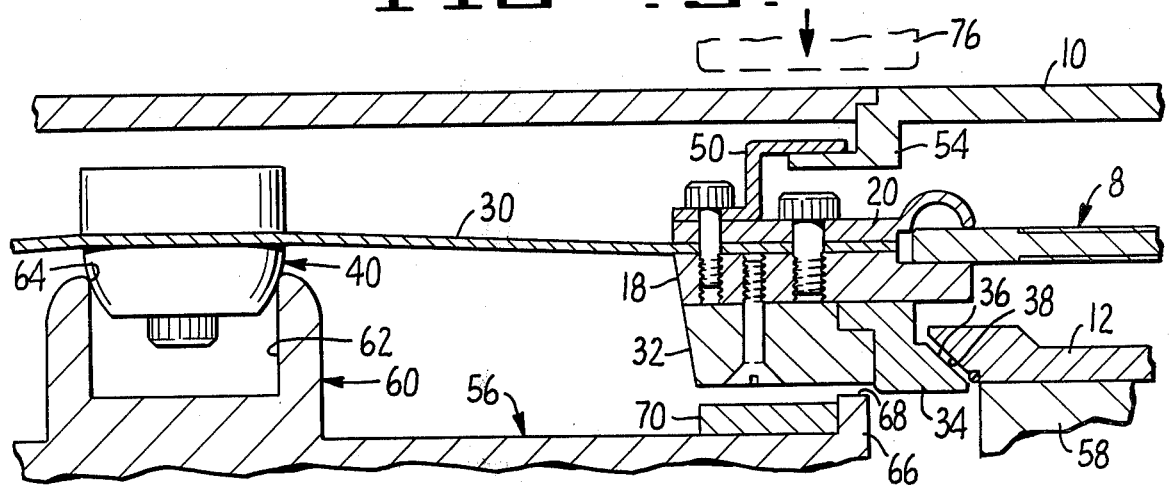

FIG. 4 represents the continuing movement of the cartridge and disc toward the drive spindle. In this figure, the bottom panel 12 of the cartridge housing 2 has engaged the support member 58 of the disc drive and thus stopped its downward movement. Also in this figure the portion 76 of the cartridge carrier which is positioned over the central portion of the cartridge continues its downward movement, thus causing the engagement between the cartridge lower panel 12 and support 58 to effect an upward deflection of that cartridge bottom panel 12 relative to the disc hub, out of engagement with the conical hub flange 34. In this position the proximity between the magnetically attractable portion of the hub rigid portion 32 and the magnetic material 70 is already effecting an attraction between those two components, urging the disc hub downwardly. This downward urging of the disc hub rigid portion 32 with the centering member 40 already retained within the spindle hollow portion 60 thus effects a slight deflection of the disc deflectable member 30, this deflection being exaggerated in FIG. 4 (and also FIG. 5) for purposes of illustration.

Figure 5:
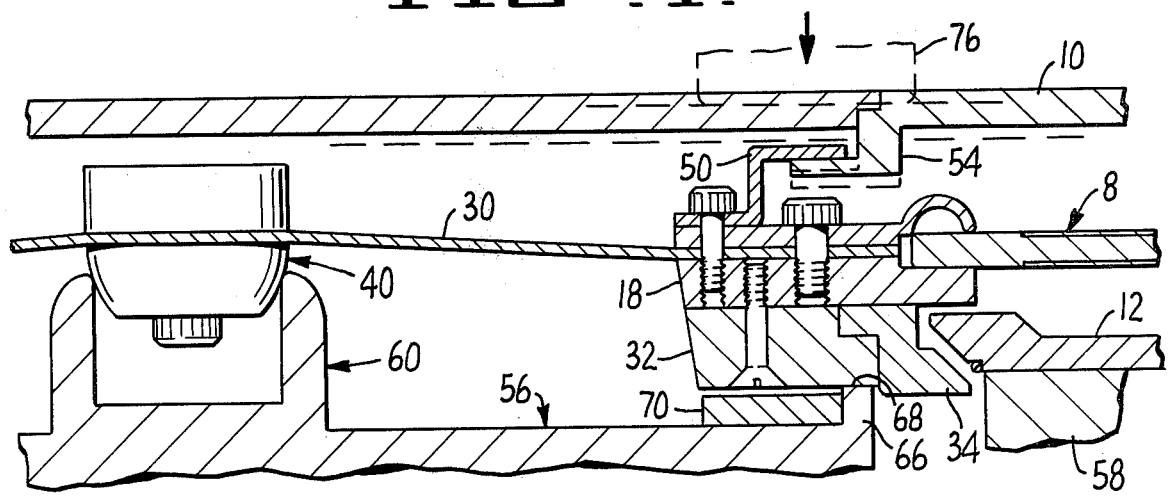

FIG. 5 illustrates the fully seated and engaged configuration of the apparatus of this invention, with the magnetically attractable portion 32 of the hub rigid portion firmly seated upon the disc hub supporting portion 66 and thus effecting a further deflection of the deflectable member 30, in the manner described immediately above. Continued downward movement of the portion 76 of the cartridge carrier will thus serve to urge the upper and lower panels 10 and 12 of the cartridge housing 6 toward a deflected condition with the upper panel 10 and lower panel 12 deflected toward one another. The further deflection of the lower panel 12 will serve further to deflect its conical portion away from the hub flange 34 to provide clearance therebetween. The additional downward deflection of the cartridge upper panel 10 will deflect that panel from the solid line position of FIG. 5 to the position indicated by the broken line representation. Such deflection will deflect the supporting member 54 downwardly from, and thus out of engagement with, the hub retaining ring 50, thus eliminating any remaining contact between the disc assembly and any portions of the cartridge housing 6. Thus, the disc assembly 8 is now supported by the disc drive spindle 56 for free rotation by virtue of the driving engagement therewith, with no interference between the disc and any portions of the cartridge housing.

In the configuration illustrated in FIG. 5 the recording disc is now ready for cooperation with the disc drive recording/playback transducers, which may be introduced into operative relationship with the recording surfaces of the disc through an aperture in the peripheral wall of the cartridge housing. Such aperture and transducers as well as the remaining portions of the disc drive form no part of the present invention and may be of any suitable configuration known to those skilled in the art, and thus are not illustrated herein.

It should be readily apparent that the steps involved in removal of the cartridge from its engagement with the disc drive unit will generally entail a simple reversal of the steps described and illustrated above.

Figure 6:
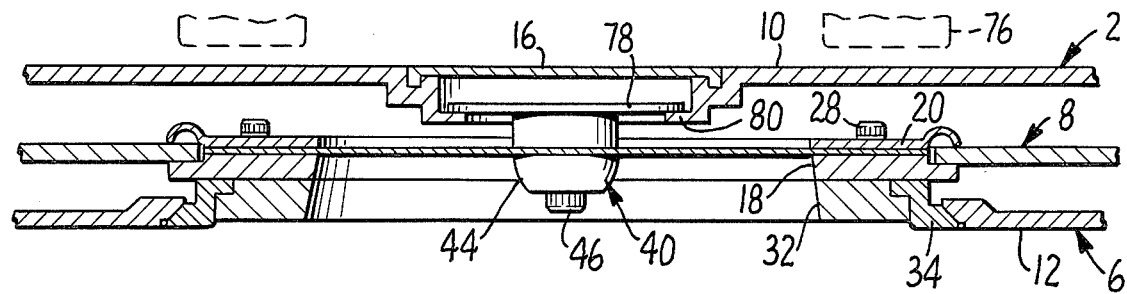
FIG. 6 is a fragmentary sectional view taken through the center of a second embodiment of the cartridge of FIG. 1, and FIGS. 7 and 8 are sectional views, generally corresponding to FIGS. 2 and 5, illustrating the manner of engagement of the disc cartridge of FIG. 6 with the drive unit.
Figure 7:
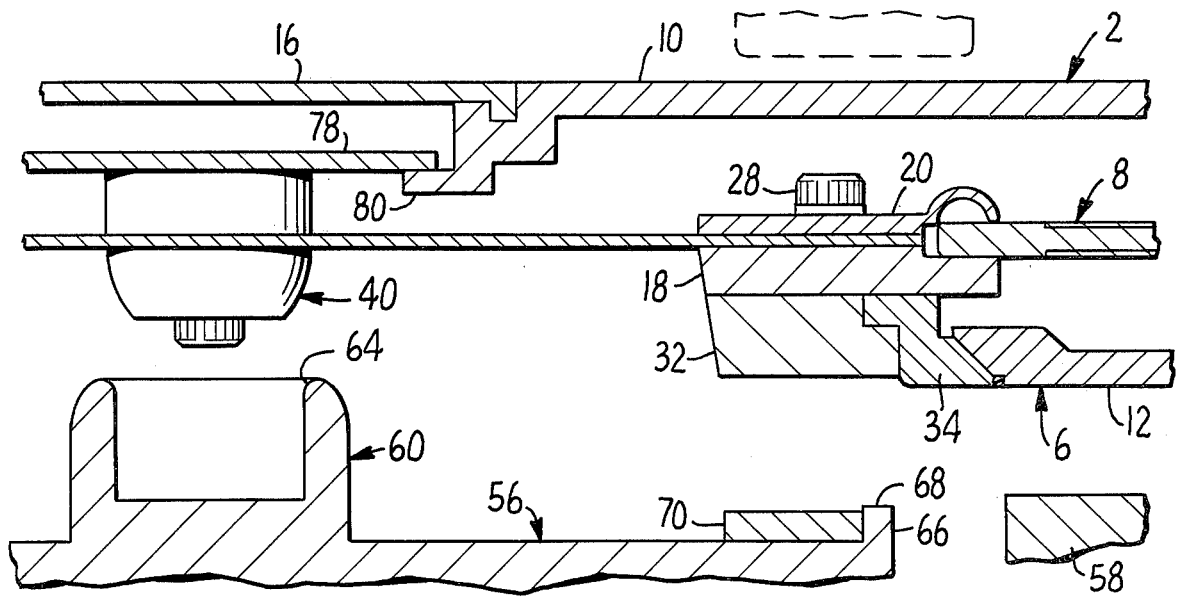
Figure 8:
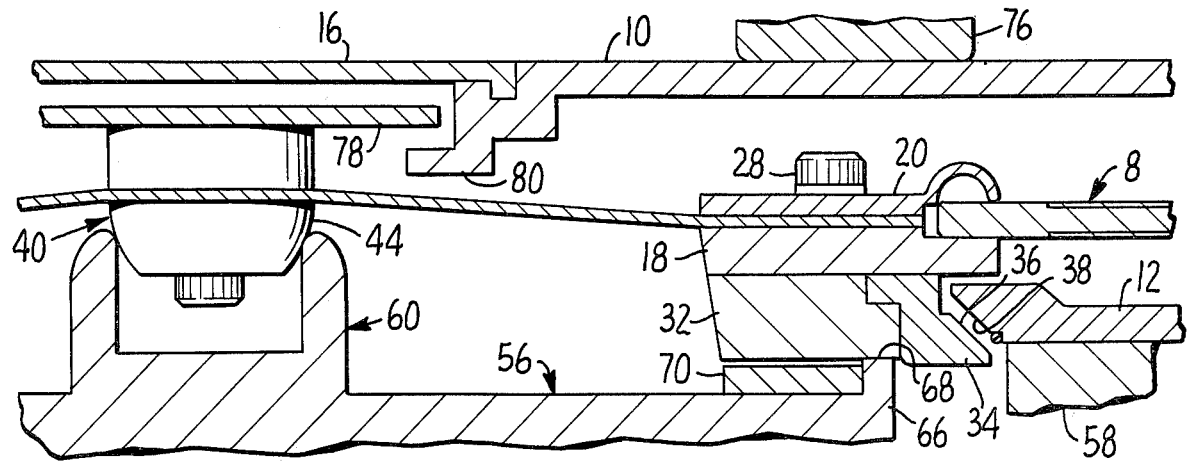

FIGS. 6 through 8 represent a generally equivalent structure utilizing a slightly different disc retaining arrangement in which the retaining member attached to the recording disc assembly may itself comprise a flat disc 78 attached to the centering member 40 by threaded engagement with the same fastener 46 which attaches that centering member 40 to the disc assembly. This retaining disc 78 engages a retaining lip 80 in a manner exactly analogous to the engagement between the retaining ring 50 and the cartridge retaining lip 54 of the embodiment of FIGS. 1 through 5.

As illustrated in FIGS. 7 and 8, the insertion and engagement of the cartridge assembly of FIGS. 6 through 8 entails substantially the same steps as illustrated in FIGS. 2 through 5 with final engagement lifting the retaining disc 78 free of engagement with retaining lip 80 to provide for free rotation of the disc within the cartridge. Since all components of this second embodiment of the disc cartridge except for the retaining disc 78 and lip 80 are substantially identical with that of the embodiment of FIGS. 1 through 5, the same reference numerals are retained throughout.

The foregoing embodiments of the apparatus of this invention are depicted with the disc and spindle axes generally vertical. It is to be understood that the invention may be practiced equally well with the axes horizontal or in any other suitable orientation.

While the foregoing illustrates two particularly preferred embodiments of the apparatus of this invention, it is to be recognized that numerous variations and modifications of this apparatus, all within the scope of the invention, will readily occur to those skilled in the art. Accordingly, since such modifications and variations are all intended to be encompassed within the scope of this invention, the invention is to be limited solely by the scope of the claims appended hereto.

What is claimed is:

1. For a magnetic recording disc, apparatus for removably mounting and rotatably driving such disc by a disc drive, which disc drive includes a rotatably driven spindle having a cylincrically hollow portion with an open outer end centered upon the axis of rotation and a disc hub supporting and drivingly engaging portion spaced radially outwardly from the cylindrically hollow portion, said mounting and driving apparatus comprising a deflectable member forming a portion of said disc and extending radially inwardly of the recording surface of said recording disc and having an axially resiliently deflectable portion generally adjacent the disc axis, a centering member coaxially mounted to said deflectable member and extending downwardly of the lower surface thereof and having a generally spherically curved convex surface curving inwardly away from said deflectable member, the spherical radius of said centering member being greater than the internal radius of said spindle cylindrical hollow portion, whereby, when the disc is advanced generally axially toward and into engagement with the spindle, engagement between the centering member and the open outer end of the spindle hollow portion will effect centering of the centering member and thus of the recording disc with respect to the spindle, and a rigid hub portion positioned radially between the disc recording surface and the deflectable portion of said deflectable member, the lowermost part of said rigid hub portion being positioned such that disc centering member and said spindle cylindrically hollow portion engage one another before said hub supporting and drivingly engaging portion of said spindle and said hub rigid portion drivingly engage one another when said disc is advanced generally axially toward said spindle, whereby the engagement of the centering member and the spindle hollow portion serve to align the disc and spindle coaxially with one another before driving engagement is made between the disc hub and the spindle.

2. The apparatus of claim 1 wherein the center of curvature of said centering member spherically curved surface lies substantially on the axis of said recording disc and generally in a plane which extends through the center of said recording disc and substantially parallel to the recording surfaces thereof.

3. The apparatus of claim 1 wherein said disc drive spindle hollow portion has an internal surface defining a generally right circular cylinder concentric with said axis of rotation.

4. The apparatus of claim 3 wherein said spindle hollow portion includes a conical portion, at the axially outer end of said cylindrical portion for engaging said disc centering member.

5. The apparatus of claim 1 wherein at least the part of said disc hub rigid portion which engages said disc hub supporting portion of said spindle is formed of a magnetically attractable material, whereby provision in the spindle of a magnetic material for magnetically attracting said magnetically attractable part of the hub will urge the hub into engagement with the hub supporting portion of the spindle.

6. The apparatus of claim 1 further comprising a cartridge housing for enclosing the recording surfaces of said disc when said disc and housing are removed from the disc drive, said housing including an upper member extending generally transversely of said disc axis and over the upper surfaces of said disc, a lower member generally parallel to said upper member and extending below said disc recording surfaces, and a peripheral portion extending between said upper member and said lower member, said recording disc and said cartridge housing together forming a recording disc cartridge.

7. The apparatus of claim 6 wherein said recording disc includes retaining means extending axially above the upper surfaces of said disc hub, and wherein said cartridge housing upper member includes means for releasably engaging said disc retaining means and restraining axial and radial movement of said disc when said disc is removed from engagement with the disc drive.

8. The apparatus of claim 7 wherein said drive further includes means for receiving said cartridge and moving said cartridge in a direction generally parallel to said spindle axis to an installed position which brings said disc hub into driving engagement with said spindle, and wherein said disc retaining means and said releasably engaging and restraining means are positioned such that, when said cartridge is moved to said installed position on said drive with said disc hub drivingly engaging said spindle, said disc retaining means is lifted free of engagement with said releasably engaging and restraining means, whereby there is no engagement between the disc retaining means and the releasably engaging and restraining means when the disc is rotatably driven by the drive.

9. The apparatus of claim 8 wherein said cartridge housing lower member includes means for resiliently and releasably engaging a lower portion of said disc hub when said cartridge is removed from said drive, such that the resilient engagement between the hub and the housing lower member serves to seal the volume between the inside of the housing lower member and the disc recording surface from intrusion of foreign matter when the cartridge is removed from the drive.

10. The apparatus of claim 9 wherein said drive includes means for deflecting said hub resiliently engaging means of said housing lower member away from said engagement with said hub when said cartridge is moved by said drive to said installed position, whereby the disc is freed from any engagement with the cartridge housing as the disc hub is moved into driving engagement with the drive spindle.

11. The apparatus of claim 10 wherein said hub lower portion and said hub resiliently engaging means of said housing lower member are positioned such that, when said cartridge is removed from said drive, the resilient engagement between said housing lower member and said hub serves to urge said disc retaining means into engagement with said disc engaging and restraining means of said housing upper member.

12. The apparatus of claim 9 wherein said resiliently and releasably engaging means of said housing lower member includes a circular aperture generally concentric with the axis of said disc, said aperture having a generally conical surface tapering outwardly and downwardly, and wherein said hub lower portion includes a matingly conical portion for matingly engaging said aperture conical surface, whereby the mating conical surfaces form a resilient conical seal to exclude foreign matter from entry into the cartridge through the lower member aperture when the cartridge is removed from the drive.

* * * * *